(12) United States Patent
Cammarota et al.

(10) Patent No.: US 10,102,375 B2
(45) Date of Patent: Oct. 16, 2018

(54) MULTI-MODAL MEMORY HIERARCHICAL MANAGEMENT FOR MITIGATING SIDE-CHANNEL ATTACKS IN THE CLOUD

(71) Applicant: QUALCOMM Incorporated, San Diego, CA (US)

(72) Inventors: Rosario Cammarota, San Diego, CA (US); Roberto Avanzi, Munich (DE); Ramesh Chandra Chauhan, San Diego, CA (US); Harold Wade Cain, III, Raleigh, NC (US); Darren Lasko, Forest, VA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 15/234,909

(22) Filed: Aug. 11, 2016

(65) Prior Publication Data

US 2018/0046808 A1    Feb. 15, 2018

(51) Int. Cl.
*G06F 21/57* (2013.01)
*G06F 12/0877* (2016.01)
(Continued)

(52) U.S. Cl.
CPC .......... *G06F 21/57* (2013.01); *G06F 12/0877* (2013.01); *G06F 12/0891* (2013.01);
(Continued)

(58) Field of Classification Search
CPC ... G06F 12/0815; G06F 12/0877; G06F 21/57
See application file for complete search history.

(56) References Cited

U.S. PATENT DOCUMENTS 7,290,289 B2    10/2007  Janke et al.
7,565,492 B2     7/2009  McKeen et al.
(Continued)

OTHER PUBLICATIONS

Fangfei L., et al., "Random Fill Cache Architecture", 2014 47th Annual IEEE/Acm International Symposium on Microarchitecture; [Proceedings of the Annual Acm/ IEEE International Symposium on Microarchitecture], IEEE Computer Society, 1730 Massachusetts Ave., Nw Washington, DC 20036-1992 USA, Dec. 13, 2014 (Dec. 13, 2014), pp. 203-215, XP032725112, ISSN:1072-4451, DOI:10.1109/MICRO.2014.28 ISBN: 978-0-7695-304 7-5 [retrieved on Jan. 15, 2015].

(Continued)

*Primary Examiner* — Dao Q Ho
(74) *Attorney, Agent, or Firm* — James T. Hagler; Hunter Clark PLLC

(57) ABSTRACT

Techniques for preventing side-channel attacks on a cache are provided. A method according to these techniques includes executing a software instruction indicating that a portion of software requiring data protection is about to be executed, setting the cache to operate in a randomized mode to de-correlate cache timing and cache miss behavior from data being processed by the portion of software requiring data protection responsive to the instruction indicating that the portion of software requiring data protection is about to be executed, executing the portion of software requiring data protection, storing the data being processed by the portion of software requiring data protection, and setting the cache to operate in a standard operating mode responsive to an instruction indicating that execution of the portion of software requiring data protection has completed.

25 Claims, 7 Drawing Sheets

(51) Int. Cl.
*G06F 12/0891* (2016.01)
*G06F 21/55* (2013.01)
*G06F 21/75* (2013.01)
*G06F 21/79* (2013.01)

(52) U.S. Cl.
CPC ............ *G06F 21/556* (2013.01); *G06F 21/75* (2013.01); *G06F 21/79* (2013.01); *G06F 2212/1052* (2013.01); *G06F 2212/603* (2013.01)

(56) References Cited

U.S. PATENT DOCUMENTS

| | | |
|---|---|---|
| 8,781,111 B2 | 7/2014 | Qi et al. |
| 2013/0254494 A1 | 9/2013 | Oxford et al. |
| 2015/0082434 A1 | 3/2015 | Sethumadhavan et al. |
| 2015/0347760 A1 | 12/2015 | Kruglick |
| 2016/0170889 A1* | 6/2016 | Lee .................... G06F 12/0862 711/118 |

OTHER PUBLICATIONS

International Search Report and Written Opinion—PCT/US2017/041849—ISA/EPO—dated Sep. 4, 2017.

* cited by examiner

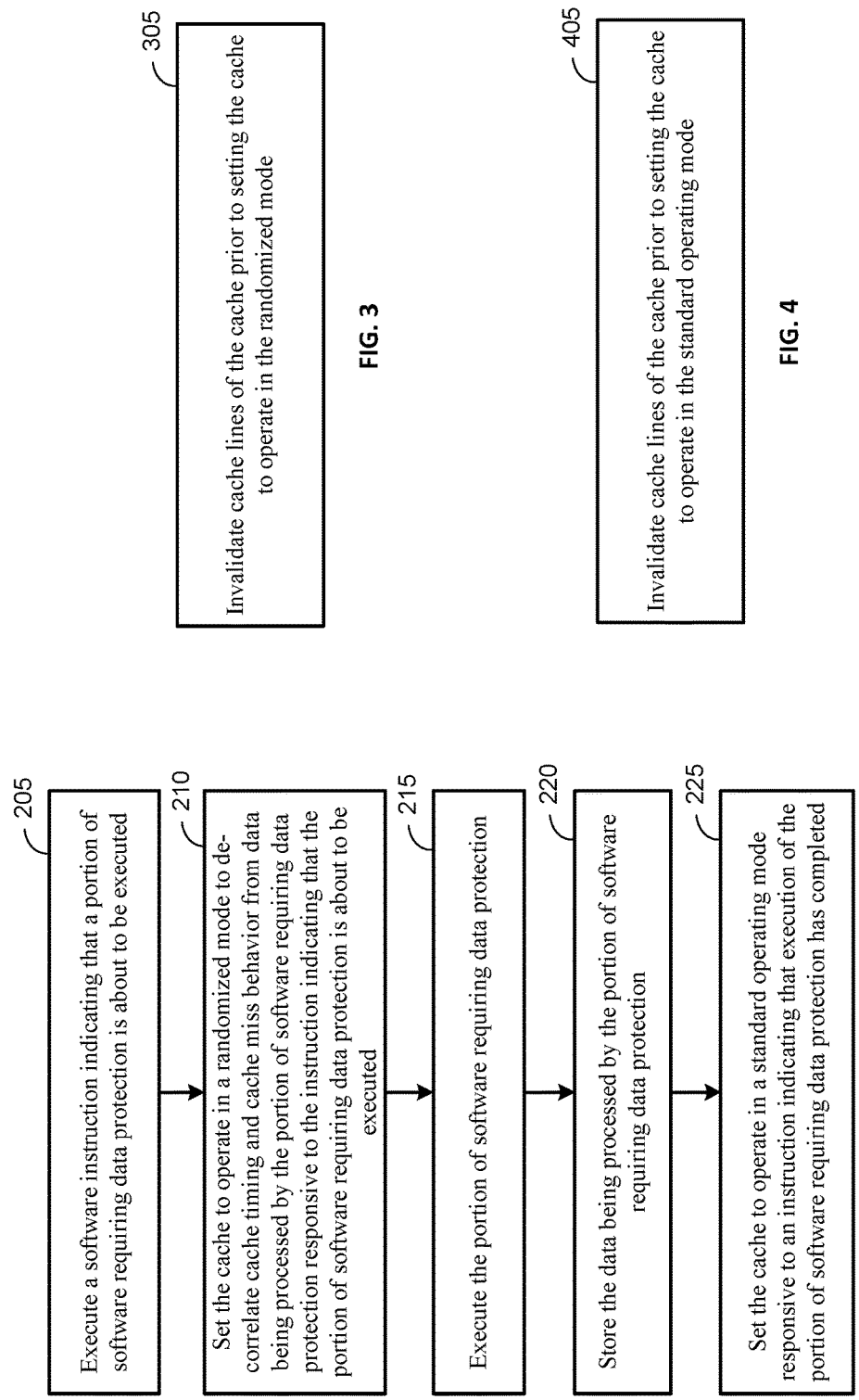

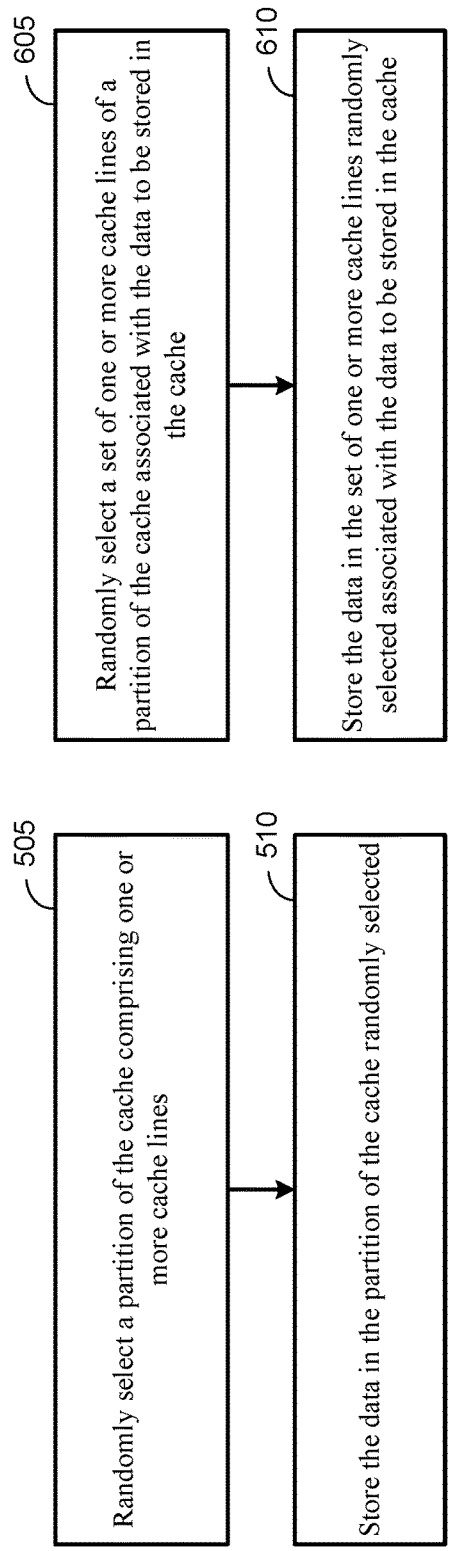

MULTI-MODAL MEMORY HIERARCHICAL MANAGEMENT FOR MITIGATING SIDE-CHANNEL ATTACKS IN THE CLOUD

BACKGROUND

Software Side-Channel Attacks (SCAs) can occur in servers in the cloud exposing assets even in secure software and/or data—IP, confidential information. An attacker can manipulate a shared resource used by process controlled by the attacker and a target process on a cloud server to discern information about the secure software and/or data of the target process. Cache interference is one technique that an attacker may use to modify a shared resource (the cache) in order to breach the security of the software and/or data of the target process.

SUMMARY

An example method for mitigating side-channel attacks on a cache according to the disclosure includes executing a software instruction indicating that a portion of software requiring data protection is about to be executed; setting the cache to operate in a randomized mode to de-correlate cache timing and cache miss behavior from data being processed by the portion of software requiring data protection responsive to the instruction indicating that the portion of software requiring data protection is about to be executed; executing the portion of software requiring data protection; storing the data being processed by the portion of software requiring data protection; and setting the cache to operate in a standard operating mode responsive to an instruction indicating that execution of the portion of software requiring data protection has completed.

Implementations of such a method can include one or more of the following features. Setting the cache to operate in the randomized mode to de-correlate the cache timing and the cache miss behavior from the data being processed by the portion of software requiring data protection includes invalidating cache lines of the cache prior to setting the cache to operate in the randomized mode. Setting the cache to operate in the standard operating mode responsive to the instruction indicating that execution of the portion of software requiring data protection has completed includes invalidating cache lines of the cache prior to setting the cache to operate in the standard operating mode. Storing the data being processed by the portion of software requiring data protection in the cache includes: randomly selecting a partition of the cache comprising one or more cache lines; and storing the data in the partition of the cache randomly selected. Storing the data being processed by the portion of software requiring data protection includes: randomly selecting a set of one or more cache lines of a partition of the cache associated with the data to be stored in the cache; and storing the data in the set of one or more cache lines randomly selected associated with the data to be stored in the cache. Storing the data being processed by the portion of software requiring data protection includes: randomly selecting a partition of the cache comprising one or more cache lines; randomly selecting a set of one or more cache lines of the partition of the cache randomly selected; and storing the data in the set of one or more cache lines randomly selected. Determining that a context switch has occurred while executing the portion of software requiring data protection; storing cache status information for restoring a current cache operating mode in a protected memory location; invalidating cache lines of the cache; and setting the cache to operate in the standard operating mode responsive to the context switch. Determining that a second context switch to continue executing the portion of software requiring data protection has occurred; accessing the cache status information for restoring the current cache operating mode in the protected memory location; and setting the cache to operate in the randomized mode using the cache status information. Executing the portion of software requiring data protection includes trapping an exception; invalidating cache lines of the cache; and performing one or more exception handling actions responsive to the exception. Monitoring execution of instructions associated with the portion of software requiring data protection to ensure that both an entry instruction for entering the instructions associated with the portion of software requiring data protection and an exit instruction exiting the portion of software requiring data protection are executed.

An example apparatus according to the disclosure includes a memory and a processor coupled to the memory. The processor configured to: execute a software instruction indicating that a portion of software requiring data protection is about to be executed; set a cache to operate in a randomized mode to de-correlate cache timing and cache miss behavior from data being processed by the portion of software requiring data protection responsive to the instruction indicating that the portion of software requiring data protection is about to be executed; execute the portion of software requiring data protection; store the data being processed by the portion of software requiring data protection; and set the cache to operate in a standard operating mode responsive to an instruction indicating that execution of the portion of software requiring data protection has completed.

Implementations of such an apparatus can include one or more of the following features. The processor being configured to set the cache to operate in the randomized mode to de-correlate the cache timing and the cache miss behavior from the data being processed by the portion of software requiring data protection is further configured to invalidate cache lines of the cache prior to setting the cache to operate in the randomized mode. The processor being configured to set the cache to operate in the standard operating mode responsive to the instruction indicating that execution of the portion of software requiring data protection has completed is further configured to invalidate cache lines of the cache prior to setting the cache to operate in the standard operating mode. The processor being configured to store the data being processed by the portion of software requiring data protection in the cache is further configured to: randomly select a partition of the cache comprising one or more cache lines; and store the data in the partition of the cache randomly selected. The processor being configured to store the data being processed by the portion of software requiring data protection is further configured to: randomly select a set of one or more cache lines of a partition of the cache associated with the data to be stored in the cache; and store the data in the set of one or more cache lines randomly selected associated with the data to be stored in the cache. The processor being configured to store the data being processed by the portion of software requiring data protection is further configured to: randomly select a partition of the cache comprising one or more cache lines; randomly select a set of one or more cache lines of the partition of the cache randomly selected; and store the data in the set of one or more cache lines randomly selected. The processor is further configured to: determine that a context switch has occurred while executing the portion of software requiring data protection; store cache status information for restoring a current cache operating mode in a protected memory location; invalidate cache lines of the cache; and set the cache to operate in the standard operating mode responsive to the context switch. The processor is further configured to: determine that a second context switch to continue executing the portion of software requiring data protection has occurred; access the cache status information for restoring the current cache operating mode in the protected memory location; and set the cache to operate in the randomized mode using the cache status information. The processor being configured to execute the portion of software requiring data protection is further configured to: trap an exception; invalidate cache lines of the cache; and perform one or more exception handling actions responsive to the exception. The processor is further configured to monitor execution of instructions associated with the portion of software requiring data protection to ensure that both an entry instruction for entering the instructions associated with the portion of software requiring data protection and an exit instruction exiting the portion of software requiring data protection are executed.

An example apparatus according to the disclosure includes means for executing a software instruction indicating that a portion of software requiring data protection is about to be executed; means for setting a cache to operate in a randomized mode to de-correlate cache timing and cache miss behavior from data being processed by the portion of software requiring data protection responsive to the instruction indicating that the portion of software requiring data protection is about to be executed; means for executing the portion of software requiring data protection; means for storing the data being processed by the portion of software requiring data protection; and means for setting the cache to operate in a standard operating mode responsive to an instruction indicating that execution of the portion of software requiring data protection has completed.

Implementations of such an apparatus can include one or more of the following features. Means for invalidating cache lines of the cache prior to setting the cache to operate in the randomized mode. The means for setting the cache to operate in the standard operating mode responsive to the instruction indicating that execution of the portion of software requiring data protection has completed include means for invalidating cache lines of the cache prior to setting the cache to operate in the standard operating mode. The means for storing the data being processed by the portion of software requiring data protection in the cache includes means for randomly selecting a partition of the cache comprising one or more cache lines; and means for storing the data in the partition of the cache randomly selected. The means for storing the data being processed by the portion of software requiring data protection includes: means for randomly selecting a set of one or more cache lines of a partition of the cache associated with the data to be stored in the cache; and storing the data in the set of one or more cache lines randomly selected associated with the data to be stored in the cache.

An example non-transitory, computer-readable medium according to the disclosure has stored thereon computer-readable instructions for mitigating side-channel attacks on a cache includes instructions configured to cause a computing device to: execute a software instruction indicating that a portion of software requiring data protection is about to be executed; set the cache to operate in a randomized mode to de-correlate cache timing and cache miss behavior from data being processed by the portion of software requiring data protection responsive to the instruction indicating that the portion of software requiring data protection is about to be executed; execute the portion of software requiring data protection; store the data being processed by the portion of software requiring data protection; and set the cache to operate in a standard operating mode responsive to an instruction indicating that execution of the portion of software requiring data protection has completed.

Implementations of such a non-transitory, computer-readable medium can include one or more of the following features. The instructions configured to cause the computing device to set the cache to operate in the randomized mode to de-correlate the cache timing and the cache miss behavior from the data being processed by the portion of software requiring data protection include instructions configured to cause the computing device to invalidate cache lines of the cache prior to setting the cache to operate in the randomized mode. The instructions configured to cause the computing device to set the cache to operate in the standard operating mode responsive to the instruction indicating that execution of the portion of software requiring data protection has completed include instructions configured to cause the computing device to invalidate cache lines of the cache prior to setting the cache to operate in the standard operating mode. The instructions configured to cause the computing device to store the data being processed by the portion of software requiring data protection in the cache include instructions configured to cause the computing device to: randomly select a partition of the cache comprising one or more cache lines; and store the data in the partition of the cache randomly selected. The instructions configured to cause the computing device to store the data being processed by the portion of software requiring data protection include instructions configured to cause the computing device to: randomly select a set of one or more cache lines of a partition of the cache associated with the data to be stored in the cache; and store the data in the set of one or more cache lines randomly selected associated with the data to be stored in the cache.

BRIEF DESCRIPTION OF THE DRAWING

FIG. 2 is a flow diagram of an example process for mitigating side-channel attacks on a cache according to the techniques disclosed herein.

FIG. 3 is a flow diagram of an example process for mitigating side-channel attacks on a cache according to the techniques disclosed herein.

FIG. 4 is a flow diagram of an example process for mitigating side-channel attacks on a cache according to the techniques disclosed herein.

FIG. 5 is a flow diagram of an example process for storing data in the cache for software requiring data protection according to the techniques disclosed herein.

FIG. 6 is a flow diagram of an example process for storing data in the cache for software requiring data protection according to the techniques disclosed herein.

Like reference symbols in the various drawings indicate like elements, in accordance with certain example implementations.

DETAILED DESCRIPTION

Described herein are methods, systems, devices, computer readable media, and other implementations, for protecting software that operates on sensitive data and requires data protection by mitigating side-channel attacks on a cache in which the data may be stored by the software. The techniques described herein provide for protected software having controlled entry and exit points that can operate a cache in a randomized mode to mitigate side-channel attacks on the cache that may compromise the sensitive data. The accompanying drawings and the description below discusses each of these approaches in greater detail.

Example embodiments include, for example, methods including one or more of:

Methods, systems, devices, computer readable media, and other implementations for protecting software modules. An example method according to these techniques includes:

executing a software instruction indicating that a portion of software requiring data protection is about to be executed;

setting the cache to operate in a randomized mode to de-correlate cache timing and cache miss behavior from data being processed by the portion of software requiring data protection responsive to the instruction indicating that the portion of software requiring data protection is about to be executed;

executing the portion of software requiring data protection;

storing the data being processed by the portion of software requiring data protection; and setting the cache to operate in a standard operating mode responsive to an instruction indicating that execution of the portion of software requiring data protection has completed.

Implementations of such example systems and methods are illustrated in the accompanying figures and discussed in detail in the following example implementations.

Figure 1:
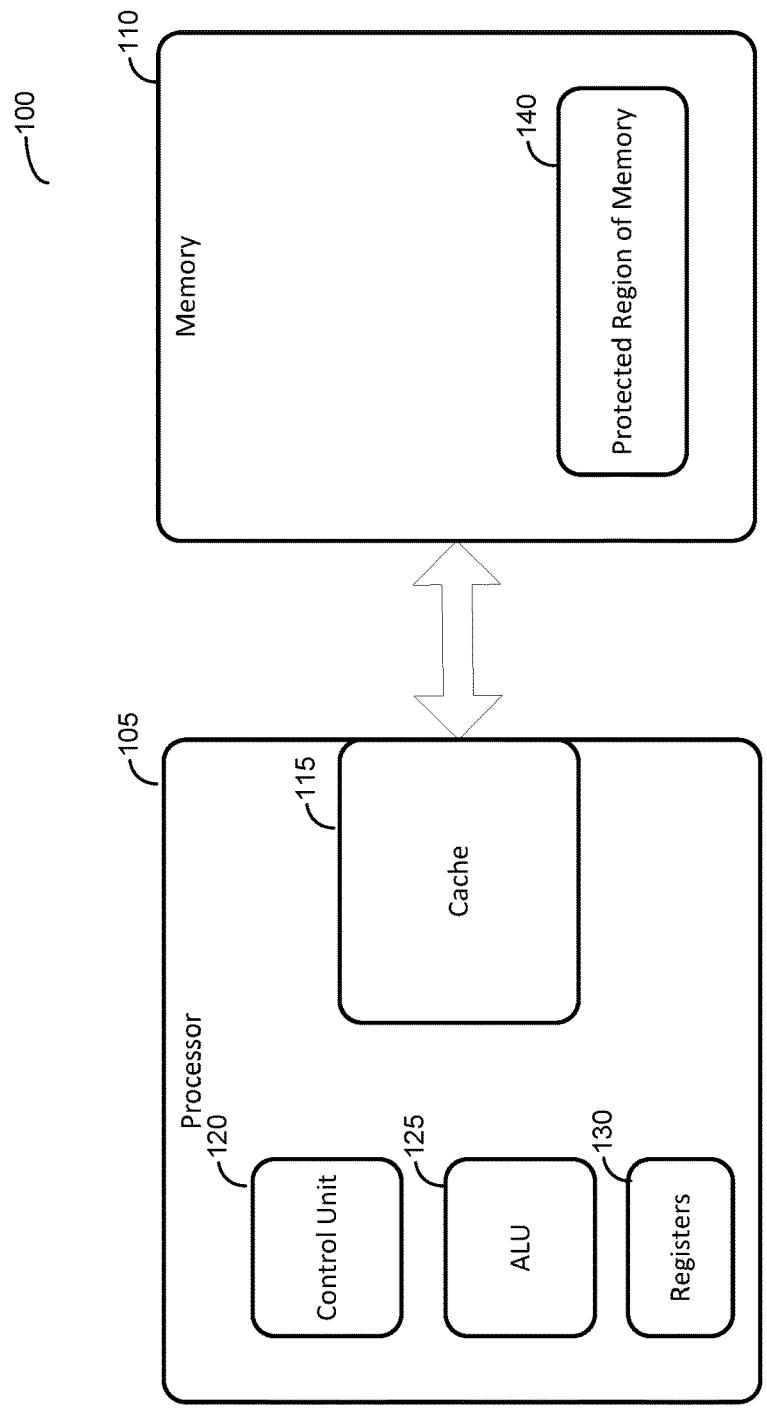
FIG. 1 is a schematic diagram of an example computing device that can be used to implement the techniques disclosed herein.

FIG. 1 is a schematic diagram of an example computing device 100 that can be used to implement the techniques disclosed herein. The computing device 100 can comprise a computer server, and the computer server can be used to implement cloud-based services and may be part of a collection of servers. The computing device 100 can be a personal computing device, such as a laptop computer, tablet computer, smartphone, wearable computing device, or other type of personal computing device.

The computing device 100 can include a processor 105 and a memory 110. The processor 105 can be configured to store data in and to retrieve data from the memory 110. The processor 105 can be communicatively coupled to the memory 110 via a bus. The bus can include a data bus and an address bus. The data bus can be used to move data to and from the memory 110 and the address bus can be used to reference specific addresses in the memory 110. The memory 110 can include a trusted portion 140 of the memory that can be allocated to securely store sensitive data, such as the program code for data protection and the data associated with the program code. The trusted portion 140 of the memory 110 can be encrypted and authenticated to prevent other processes from accessing or modifying the data therein. The trusted portion 140 of the memory 110 may be substantially inaccessible to threads, processes, or applications that are being executed outside of the trusted execution environment and in the rich execution environment of the computing device 100.

The processor 105 can include a cache 115 that can be used to store data retrieved from the memory 110 and/or data to be written to the memory 110. Accessing data in the memory 110 can be time intensive, and storing data locally in the cache 115 can significantly reduce the time required to read or write data.

The processor can also include a control unit 120 for directing operation of the components of the processor 105, an arithmetic logic unit (ALU) 125 for performing arithmetic and bitwise operations, and one or more registers 130 for storing data that may be used by program code or for internal processor operations. The elements of the processor 105 illustrated herein are merely an example of one possible implementation of a computing device 100 that may be used to implement the techniques disclosed herein. Other implementations of computing devices that can be used to implement the techniques disclosed herein may include additional elements not illustrated herein in addition to or instead of one or more of the elements of the computing device 100 illustrated in FIG. 1. For example, a computing device may include multiple processors and/or multiple caches.

FIG. 2 is a flow diagram of an example process for mitigating side-channel attacks on a cache according to the techniques disclosed herein. The process illustrated in FIG. 2 can be performed by the processor 105 unless otherwise indicated. The processor 105 of the computing device 100 can execute program code that is stored in the memory 110. The program code may operate on sensitive data or perform sensitive computations. Caches, such as the cache 115, exist in almost all modern computer systems, including servers that are used for cloud computing purposes. An attacker can utilize cache interference techniques, which can monitor the timing of cache accesses to the cache 115 in order to determine information about other processes operating on the computing device 100 without having direct access the program code of the software. One approach that an attacker may use to implement such a side-channel attack is to run a process on the computing device 100 that has access to a shared resource, in this case the cache 115, in order to monitor the usage of said resource by other software which the attacker wishes to obtain information. Such attacks may occur in a cloud computing environment where the processor 105 can be executing software for multiple different users. The attacker may be a privileged user on the computing device 100 or have a higher privilege level than the user whose software is the target of the attack. The attacker can run program code at a higher privilege level than the privilege level at which the program code being attacked is operating, which can allow the attacker to precisely interleave the operation of the attacking process with the process under attack such that the attacking process can monitor the usage of the cache 115 or other shared such shared resource. The techniques disclosed herein can be used to thwart such attacks regardless of the privilege level at which the attacking process and the process under attacker are operating by enabling the process under attack to closely control the operating of the cache.

A software instruction can be executed indicating that a portion of software requiring data protection is about to be executed (stage 205). The program code may operate on sensitive that could be exposed via a side-channel attack on the cache. The program code can include an instruction that indicates to that that portion of software requiring side-channel attack protection is about to be executed by the processor 105. The instruction can call program code that that is stored in a trusted portion 140 of the memory 110 of the computing device 100. The program code stored in the trusted portion 140 of the memory can be configured to operate the cache 115 in a side-channel attack resistant mode that obscures the cache usage by the software requiring side-channel attack protection. The program code providing data protection may be a shared library that can be called from other program code that requires data protection or from other program code that does not operate on sensitive data. The shared library may be implemented as trusted application code stored in the trusted portion 140 of the memory 110 and may be executed by a trusted execution environment or other aspect of the processor 105.

Figure 8:
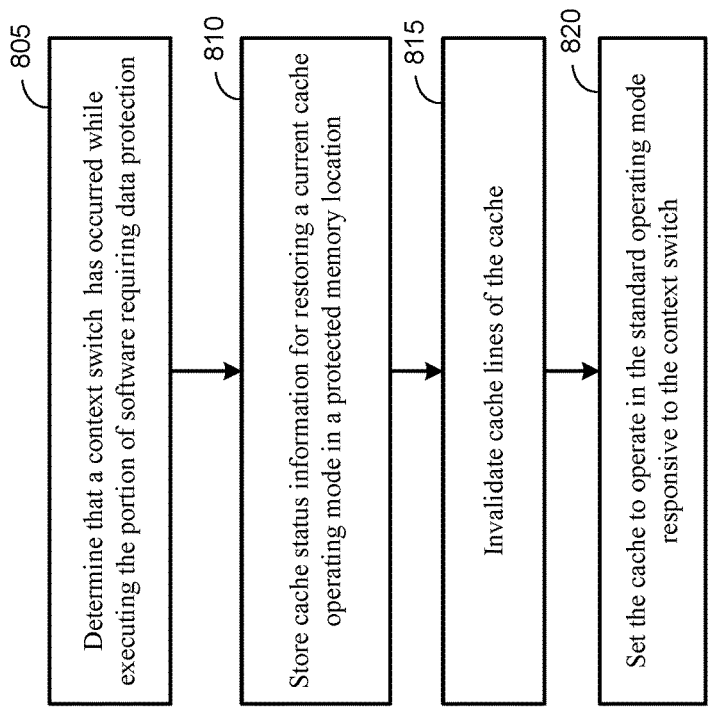
FIG. 8 is a flow diagram of an example process for responding to a context switch while the cache is set to operate in the randomized operating mode according to the techniques disclosed herein.
Figure 7:
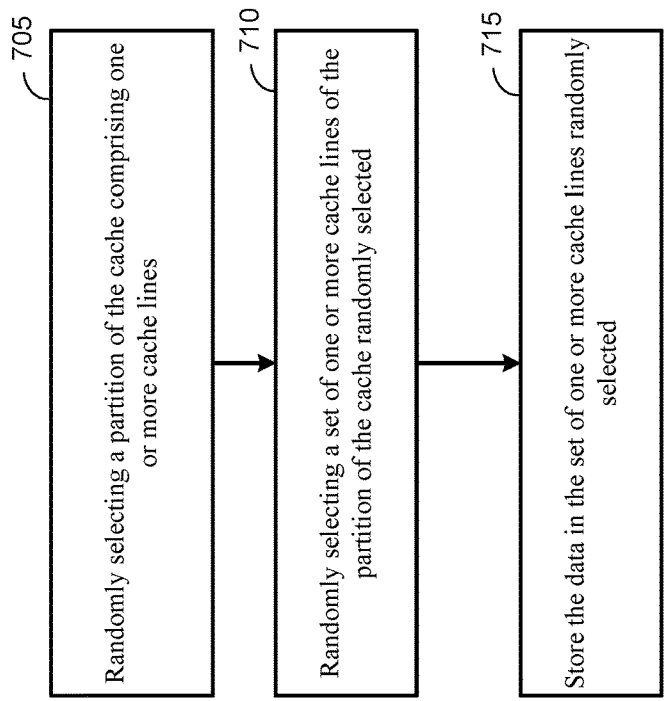
FIG. 7 is a flow diagram of an example process for storing data in the cache for software requiring data protection according to the techniques disclosed herein.

The cache can be set to operate in a randomized mode to de-correlate cache timing and cache miss behavior from data being processed by the portion of software requiring data protection responsive to the instruction indicating that the portion of software requiring data protection is about to be executed (stage 210). Side-channel attacks can utilize cache timing and cache miss behavior to deduce information about other software that is utilizing the cache 115. One technique that can be used to randomize the cache usage is to randomly select a partition into which to store data in the cache 115. In this approach, the cache can be segmented into a plurality of partitions and each partition may include one or more cache lines. The particular partition used can be randomly selected and a mapping of which data has be stored at in which partition can be maintained by the cache controller of the cache 115. Another technique that may be used to randomize the cache usage is to randomly select a cache line or lines for storing data within a partition of the cache. The partition may have been randomly selected as discussed with respect to the first randomization technique or the partition may be associated with a particular block of memory of the memory 110. The cache 115 may be subdivided into partitions associated with blocks of memory of the memory 110, and data can be stored in a particular partition based on the address of that data in the memory 110. The address can be an address where the data is stored in the memory 110 or an address to which the data is to be written to the memory 110. Yet another technique is to randomly select a cache line or cache lines from the cache 115 for storing the data. In this approach, the cache is not partitioned and the cache line or cache lines may be selected from any of the available cache lines of the cache 115. Example processes that can be used to randomization of the cache are illustrated in FIGS. 6-8, which are discussed in detail below. However, the randomization techniques are not limited to the specific examples illustrated in FIGS. 6-8.

The portion of software requiring data protection can be executed (stage 215). Once the cache has been set to operate in the randomized mode, the software requiring the side-channel attack protection can be executed. According to some implementations, the contents of the cache may have been invalidated prior to executing the portion of the software requiring the side-channel attack protection to ensure that any data stored in the cache 115 from other processes would be invalidated to prevent the other processes from monitoring which data has been replaced in the cache during execution of the software requiring data protection.

The data being processed by the portion of software requiring data protection can be stored in the cache (stage 220). The cache controller of the cache 115 can be configured to store data in the cache 115 throughout the execution of the portion of software requiring data protection. The cache controller can fetch data from the memory 110 and store the data in the cache 115 according to the randomization techniques discussed herein. The cache controller can also be configured to store data received from the processor 105 which is to be written to the memory 110 in the cache 115 according to the randomization techniques discussed herein.

The cache can be set to operate in a standard operating mode responsive to an instruction indicating that execution of the portion of software requiring data protection has completed (stage 225). The program code can include an instruction that indicates to that that execution of the portion of software requiring side-channel attack protection is about to be completed the processor 105. The instruction can call program code that that is stored in a trusted portion 140 of the memory 110 of the computing device 100 which can be configured to change the operation of the cache 115 from the randomized operating mode back to the standard operating mode for the cache. The cache lines comprising the cache can be invalidated as part of the process of setting the cache to operate in the standard operating mode so that other processes being executed on the computing device 100 cannot examine the contents of the cache 115 in an attempt to utilize cache miss information to determine what data the software requiring side-channel attack protection had accessed.

FIG. 3 is a flow diagram of an example process for mitigating side-channel attacks on a cache according to the techniques disclosed herein. The process illustrated in FIG. 3 can be used to implement, at least in part, stage 210 of the process illustrated in FIG. 2. The process illustrated in FIG. 3 can be implemented by the processor 105 unless otherwise indicated.

Cache lines of the cache can be invalidated (stage 305). The cache lines can be invalidated prior to setting the cache to operate in the randomized operating mode. All of the cache lines of the cache 115 can be invalidated prior to setting the cache to operate in the randomized mode. One or more of the cache lines may be "dirty" and include data that has not yet been written to the memory 110. These cache lines can be written to the memory 110 prior to invalidating those cache lines, so that the data stored therein is not lost. Invalidating the cache lines prior to changing the cache 115 to operate in the randomized mode can remove any information from the cache that another process may be able to use to determine which data may have been accessed by the portion of software requiring side-channel attack resistance.

FIG. 4 is a flow diagram of an example process for mitigating side-channel attacks on a cache according to the techniques disclosed herein. The process illustrated in FIG. 4 can be used to implement, at least in part, stage 225 of the process illustrated in FIG. 2. The process illustrated in FIG. 4 can be implemented by the processor 105 unless otherwise indicated.

Cache lines of the cache can be invalidated (stage 405). The cache lines can be invalidated prior to setting the cache to operate in the standard operating mode. All of the cache lines of the cache 115 can be invalidated prior to setting the cache to operate in the standard mode. One or more of the cache lines may be "dirty" and include data that has not yet been written to the memory 110. These cache lines can be written to the memory 110 prior to invalidating those cache lines, so that the data stored therein is not lost. Invalidating the cache lines prior to changing the cache 115 to operate in the standard mode can remove any information from the cache that another process may be able to use to determine which data may have been accessed by the portion of software requiring data protection.

FIG. 5 is a flow diagram of an example process for storing data in the cache for software requiring data protection according to the techniques disclosed herein. The process illustrated in FIG. 5 can be used to implement, at least in part, stage 220 of the process illustrated in FIG. 2. The process illustrated in FIG. 5 can be implemented by the processor 105 unless otherwise indicated.

A partition of the cache can be randomly selected (stage 505). The cache 115 may be segmented into a plurality of partitions and each partition may include one or more cache lines. In the standard operating mode, each partition of the cache 115 may be associated with a segment of the memory 110, and any data having an address that falls within a particular segment of the memory 110 can be stored in the partition of the cache associated with that segment of the memory. However, an attacker can use this association between the partition of the cache and the segment of the memory 110 to deduce information about what data that program code being observed by the attacker has accessed. Therefore, all of the lines of the cache can be invalidated prior to storing data associated with the program code that requires side-channel protecting in the cache 115. In contrast, in the randomized mode of operation, a random partition can be selected from the plurality of partitions included in the cache 115.

The data can be stored in the partition randomly selected (stage 510). The cache controller can store the data in a cache line of the randomly selected partition of the cache 115. Each time that data is stored in the cache, a random partition can be selected to store the data so that the same partition is not used each time that data is stored in the cache 115.

FIG. 6 is a flow diagram of an example process for storing data in the cache for software requiring data protection according to the techniques disclosed herein. The process illustrated in FIG. 6 can be used to implement, at least in part, stage 220 of the process illustrated in FIG. 2. The process illustrated in FIG. 6 can be implemented by the processor 105 unless otherwise indicated.

A set of one or more cache lines of a partition of the cache associated with the data to be stored in the cache can be randomly selected (stage 605). The cache 115 can be divided up into partitions that are associated with a particular segment of the memory 110. When data for the portion of software requiring data protection is to be placed into the cached, the data can be placed into the partition associated with the portion of memory 110 into which the address of the data belongs. One or more cache lines from this partition can be randomly selected to store the data.

The data can be stored in the set of one or more cache lines randomly selected (stage 610). The cache controller can store the data in the randomly selected one more cache lines of the partition of the cache 115. Each time that data is stored in the cache, a set of one or more random cache lines associated with the partition associated with the portion of memory 110 into which the address of the data belongs can be selected.

FIG. 7 is a flow diagram of an example process for storing data in the cache for software requiring data protection according to the techniques disclosed herein. The process illustrated in FIG. 7 can be used to implement, at least in part, stage 220 of the process illustrated in FIG. 2. The process illustrated in FIG. 7 can be implemented by the processor 105 unless otherwise indicated.

A partition of the cache comprising one or more cache lines can be selected (stage 705). A partition can be randomly selected from the plurality of partitions comprising the cache 115 similar to stage 605 of FIG. 6 discussed above. Randomly selecting the partition can make it more difficult for an attacker to derive from the cache 115 useful information about the program code requiring data protection.

One or more cache lines of the randomly selected partition can be selected (stage 710). Additional randomization can be introduced by randomly selecting one or more cache lines from the selected partition to store the data. Randomly selecting the cache line or cache lines can add yet more randomness to the cache usage to make it more difficult for an attacker to derive from the cache 115 useful information about the program code requiring data protection.

The data can be stored in the one or more cache lines randomly selected (stage 715). The cache controller can store the data in the randomly selected one more cache lines of the partition of the cache 115. Each time that data is stored in the cache, a partition can be randomly selected and a set of one or more random cache lines associated with the can be randomly selected.

FIG. 8 is a flow diagram of an example process for responding to a context switch while the cache is set to operate in the randomized operating mode according to the techniques disclosed herein. The process illustrated in FIG. 8 can be used to implement additional stages of the process illustrated in FIG. 2 or can be a standalone process. The process illustrated in FIG. 8 can be implemented by the processor 105 unless otherwise indicated.

A determination that a context switch has occurred while executing software requiring data protection can be made (stage 805). A context switch may occur while the program code requiring side-channel attack protection is executing and the cache 115 has been set to operate in the randomization mode. The cache can be cleared using the process of FIG. 8 to ensure that no data associated with the program code requiring side-channel attack protection remains in the cache 115 which could be used to derive information about the program code requiring side-channel attack protection.

Cache status information for restoring the current cache operating mode can be stored (stage 810). The cache status information can be stored in a protected memory location that is substantially inaccessible to other threads or processes operating one the computing device 100. The cache statue information can comprise information indicating the current operating mode of the cache. The operating information can be used to restore the cache to the current operating mode, e.g. the randomized operating mode or the standard operating mode, in response to a context switch. The cache may also be configured to support other operating modes, and the cache status information can be used to store an indicator of this operating mode so that the operating mode can be restored after the context switch. The operating mode information can also include information related to the operating mode. For example, the cache may be configured to operate in different cache item replacement modes while operating in the standard operating mode, such as a least-recently-used mode in which the least recently used item would be replaced first, or a first-in-first-first-out (FIFO) mode in which a first item into the cache would be the first to be replaced. The cache may also be configured to operate in different cache item replacement modes while operating in the randomized operation mode, such as the examples illustrated in the processes of FIGS. 5-7.

The cache status information can also be used to store information related to insertion of data into the cache as well as for cache eviction. Information related to the insertion of data into the cache can include set allocation information including which sets of cache lines have been allocated for storage of data, cache partitioning information, random line replacement information, and/or other policy information. For example, the cache may be configured to implement N insertion policies, where N is an integer value greater than zero, and the cache status information can comprise a number of bits equal to Ceil(log(N)) where the Ceil(X) function returns the smallest integer greater or equal to the input parameter X. The cache can be configured to maintain a table, which is not accessible by software utilizing the cache, that is used by the cache to maintain the random assignment of the data within a partition. The table can be used by the cache to maintain the assignment of sets of cache lines (whether assigned randomly or otherwise) for each partition where the cache has been partitioned. The table can included with cache status information that is stored in response to a context switch, so that the state of the cache can be restored once the execution of the thread or process resumes.

Cache lines of the cache can be invalidated (stage 815). All of the cache lines of the cache 115 can be invalidated prior to setting the cache to operate in the standard mode. One or more of the cache lines may be "dirty" and include data that has not yet been written to the memory 110. These cache lines can be written to the memory 110 prior to invalidating those cache lines, so that the data stored therein is not lost. Invalidating the cache lines prior to changing the cache 115 to operate in the standard mode can remove any information from the cache that another process may be able to use to determine which data may have been accessed by the portion of software requiring data protection.

The cache can be set to operate in the standard operating mode responsive to the context switch (stage 820). Alternatively, if the context switch is to other program code requiring data protection, the operating mode of the cache can be left in the randomized operating mode.

Figures 9, 10:
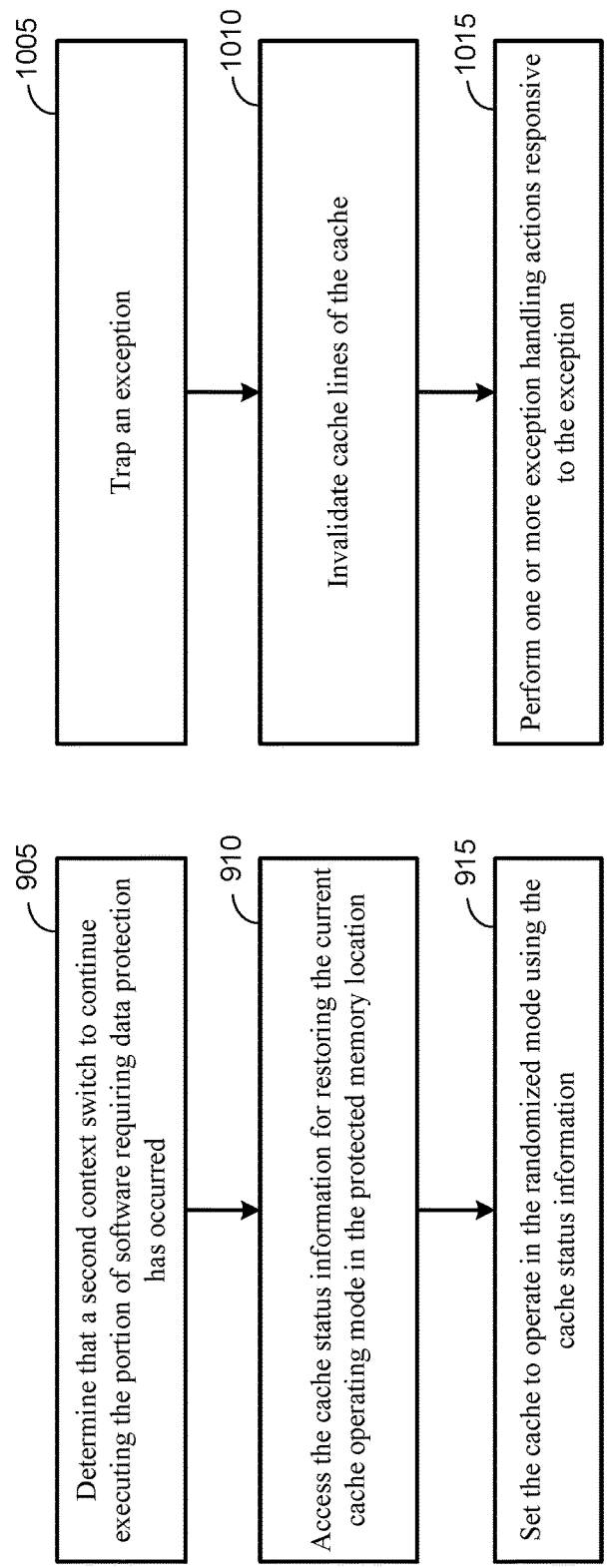
FIG. 9 is a flow diagram of an example process for responding to a context switch while the cache is set to operate in the standard operating mode according to the techniques disclosed herein.
FIG. 10 is a flow diagram of an example process for exception processing while the cache is set to operate in the randomized operating mode according to the techniques disclosed herein.

FIG. 9 is a flow diagram of an example process for responding to a context switch while the cache is set to operate in the standard operating mode according to the techniques disclosed herein. The process illustrated in FIG. 9 can be used to implement additional stages of the process illustrated in FIG. 8 or can be a standalone process. The process illustrated in FIG. 9 can be implemented by the processor 105 unless otherwise indicated.

A determination that a second context switch has occurred (stage 905). The second context switch is a context switch back to executing software that requires data protection and may be a the program code that was being executed in the example process of FIG. 8.

The cache status information for restoring the current cache operating mode can be accessed (stage 910). The cache status information can be stored in a protected memory location that is substantially inaccessible to other threads or processes operating on the computing device 100. The cache status information discussed above with respect to FIG. 8 can be accessed by the cache 115 to restore the state of the cache prior to the context switch. The cache status information can be stored by the cache in a memory that is inaccessible to the software being executed by the processor 105 to prevent software from accessing cache information from other threads or processes being executed by the processor 105. The cache 115 can be configured to determine whether the cache was being operated in a standard operating mode or a randomized operating mode prior to the context switch based on the cache status information. Where the cache 115 was being operated in the standard operating mode, the cache 115 may not need to perform any additional actions in order to resume utilization of the cache 115 by the currently operating thread. However, if the cache was being operated in the randomized mode, the cache 115 can be configured resume operation of the cache in the randomized operating mode based on the information included in the cache status information. The cache status information can include information that identifies the type of randomization that was being utilized by the cache 115. The cache 115 can resume operation in the randomized mode using this information.

The cache can be set to operate in the randomized mode using the cache status information (stage 915). The cache can be set to operate in the randomized operating mode, such is discussed above with respect to stage 210 of the process of FIG. 2. The cache lines can be invalidated prior to setting the cache to operate in the randomized operating mode. All of the cache lines of the cache 115 can be invalidated prior to setting the cache to operate in the randomized mode. One or more of the cache lines may be "dirty" and include data that has not yet been written to the memory 110. These cache lines can be written to the memory 110 prior to invalidating those cache lines, so that the data stored therein is not lost. Invalidating the cache lines prior to changing the cache 115 to operate in the randomized mode can remove any information from the cache that another process may be able to use to determine which data may have been accessed by the portion of software requiring data protection. The cache lines may have already be invalidate if the other thread or process was also executing program code that required data protection in preparation for the context switch back to the current thread or process.

FIG. 10 is a flow diagram of an example process for exception processing while the cache is set to operate in the randomized operating mode according to the techniques disclosed herein. The process illustrated in FIG. 10 can be used to implement additional stages of the process illustrated in FIG. 2 or can be a standalone process. The process illustrated in FIG. 10 can be implemented by the processor 105 unless otherwise indicated.

An exception can be trapped (stage 1005). The processor 105 can be configured to override exception handling while executing program code the requires data protection. The program code can include an entry instruction signaling the beginning of the program code that requires the data protection. The program instruction can be configured to processor 105 to override the standard exception handling to prevent an attacker from causing an exception in a process in order to force the program code that requires the data protection to terminate prematurely without first invalidating the contents of the cache 115 and setting the cache to operate in the standard operating mode. The program code can include special exception handling instructions that can be executed by the processor 105 responsive to an exception occurring.

Cache lines of the cache can be invalidated (stage 1010). All of the cache lines of the cache 115 can be invalidated responsive to the exception being trapped by the processor 105. One or more of the cache lines may be "dirty" and include data that has not yet been written to the memory 110. These cache lines can be written to the memory 110 prior to invalidating those cache lines, so that the data stored therein is not lost. Whether the dirty cache lines are written to the memory 110 may be dependent on the type of exception that has occurred. The data may be corrupted or no longer be of any use once the program code is terminated and therefore might not be written to the memory 110.

One or more exception handling actions can be performed responsive to the exception (stage 1015). The processor 105 can perform one or more actions in response to the exception. The processor 105 can be configured to set the operating mode of the cache back to the standard operating mode. The contents of the cache may have already been invalidated in stage 1010 so that no data that may be exploited by an attacker may remain in the cache 115. The processor 105 can be configured to respond to different types of exceptions in different ways. The processor 105 can be configured to halt the execution of the program code the requires data protection and to return execution to other non-protected code that called the program code requiring data protection so that the affected program code may perform one or more actions in addition to invalidating the cache lines and setting cache to operate in the standard mode. For example, the program executed may have additional steps that it may need to take to gracefully shut down as a result of the exception, such as cleaning up other data used by the program code and/or disconnecting from one or more other resources. The processor 105 can also be configured to throw one or more exceptions that may be trapped by a high-level operating system or other components of the computing device, which may be configured to take other actions in response to the exception, once the processor 105 once the cache lines have been invalidated and the cache reset to operate in the standard operating mode.

Figure 11:
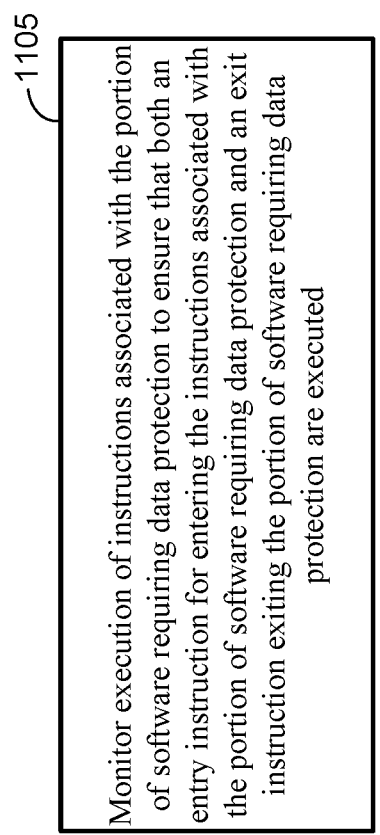
FIG. 11 is a flow diagram of an example process for monitoring the execution of software requiring data protection.

FIG. 11 is a flow diagram of an example process for monitoring the execution of software requiring data protection. The process illustrated in FIG. 11 can be used to implement additional stages of the process illustrated in FIG. 2 or can be a standalone process. The process illustrated in FIG. 11 can be implemented by the processor 105 unless otherwise indicated.

Execution of instructions associated with the portion of software requiring data protection can be monitored to ensure that both an entry instruction for entering the instructions associated with the portion of software requiring data protection and an exit instruction exiting the portion of software requiring data protection are executed (stage 1105). The protected portion of the software can include an entry instruction and an exit instruction. The entry instruction can be an instruction that is not part of the secure program code stored in the trusted portion 140 of memory 110 but may instead be a program instruction that is part of program code that can be stored in the memory 110. The entry instruction can be the instruction that is executed in stage 205 of the process illustrated in FIG. 2. The entry instruction can call the program code stored in the trusted portion 140 of memory 110 that is responsible for setting the mode of operation of the cache 115 and for overriding the exception handling by the processor 105 while the program code requiring data protection is being executed. Once the entry instruction and the associated instructions required to set the mode of operation of the cache 115 and the exception handling have been executed, the processor 105 may execute instructions associated with the program code requiring data protection. The cache 115 can be set to operate in the randomized mode and the data can be placed into the cache using the various randomization techniques discussed herein.

Upon completion of the program code requiring data protection, the processor 105 can return to the exit instruction. The exit instruction can be part of the program code stored in the trusted portion 140 of the memory 110. The exit instruction can be the instruction that is discussed above in stage 225. The exit instruction can the program code stored in the trusted portion 140 of memory 110 that is responsible for setting the mode of operation of the cache 115 back to the standard operating mode, which can include invalidating all or at least a portion of the cache lines.

The exception handling override instructions executed in response to the entry instruction can prevent an exception from causing an exit from the program code requiring data protection, the processor 105 without also executing the exit instruction. Without the exception handling override, an exception occurring during execution of the program code requiring data protection could result in the cache 115 being left in the randomized mode of operation and the contents of the cache being left intact without invalidating the cache lines. An attacker could then attempt to extract information about the program code requiring data protection based on the current state of the cache. If an exception occurs, a process similar to that illustrated in FIG. 10 can be executed to trap the exception and to change the operating mode of the cache 115 back to the standard operating mode and to invalidate some or all of the cache lines.

Figure 12:
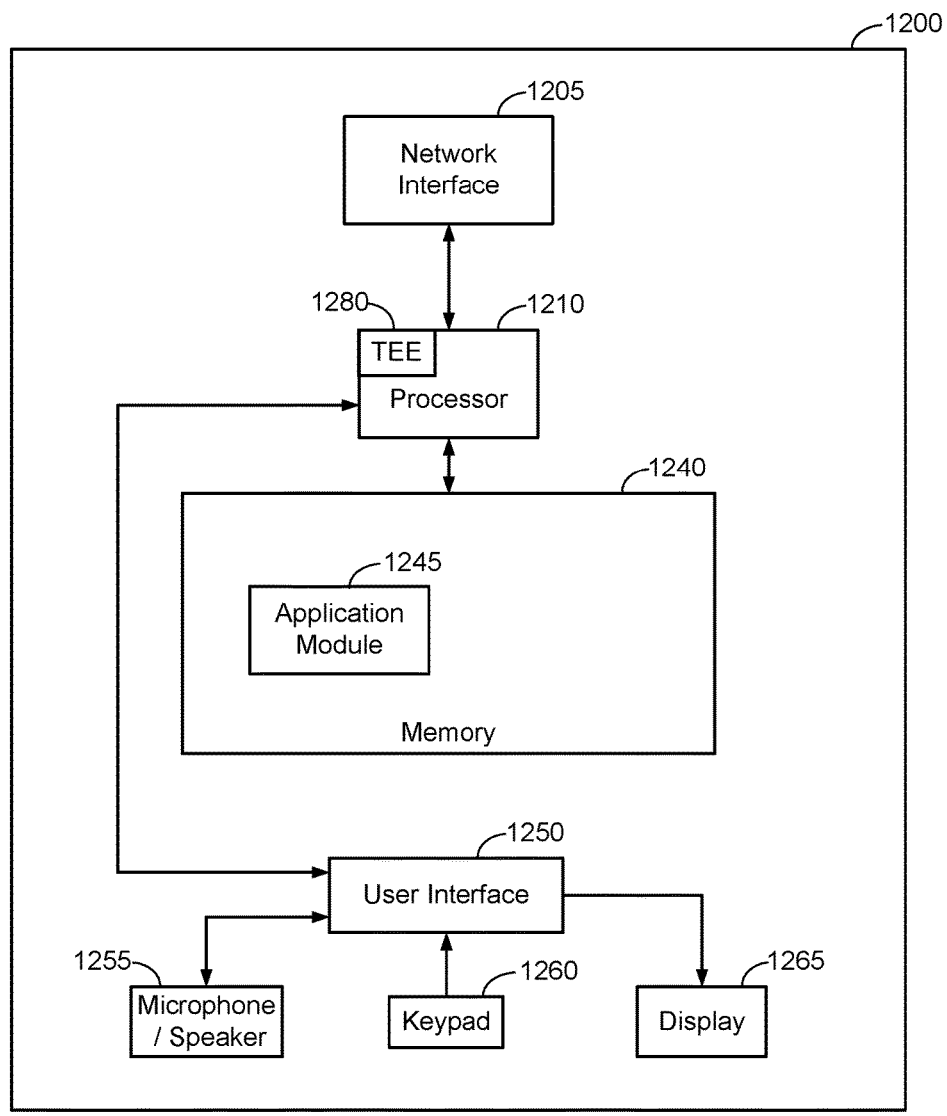
FIG. 12 is a schematic diagram of an example computing device that can be used to implement the computing device illustrated in FIG. 1.

FIG. 12 is a schematic diagram of an example computing device 1200 that can be used to implement the computing device 100 illustrated in FIG. 1. FIG. 12 is a schematic diagram illustrating various components of an example computing device 1200, which may be similar to or the same as the computing device 100 depicted in FIG. 1. For the sake of simplicity, the various features/components/functions illustrated in the schematic boxes of FIG. 12 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 12 may be further subdivided, or two or more of the features or functions illustrated in FIG. 12 may be combined. Additionally, one or more of the features or functions illustrated in FIG. 12 may be excluded.

As shown, the computing device 1200 may include one or more wired and/or wireless network interfaces 1205 through which the computing device 1200 can communicate with other networked devices. The one or more network interfaces 1205 can be configured to operated using one or more wired and/or wireless communications protocols that allow the computing device 1200 to send and receive data over a wired or wireless connection. The processor(s) (also referred to as a controller) 1210 may be connected to the network interface 1205. The processor 1210 may include one or more microprocessors, microcontrollers, and/or digital signal processors that provide processing functions, as well as other calculation and control functionality. The processor 1210 may be coupled to storage media (e.g., memory) 1214 for storing data and software instructions for executing programmed functionality within the mobile device. The memory 1214 may be on-board the processor 1210 (e.g., within the same IC package), and/or the memory may be external memory to the processor and functionally coupled over a data bus.

A number of software modules and data tables may reside in memory 1214 and may be utilized by the processor 1210 in order to manage both communications with remote devices/nodes, perform positioning determination functionality, and/or perform device control functionality. As illustrated in FIG. 12, in some embodiments, the memory 1240 may include an application module 1245 which can implement one or more applications. It is to be noted that the functionality of the modules and/or data structures may be combined, separated, and/or be structured in different ways depending upon the implementation of the computing device 1200. The application module 1245 can comprise one or more trusted applications that can be executed by the trusted execution environment 1280 of the computing device 1200.

The application module 1245 may be a process or thread running on the processor 1210 of the computing device 1200, which may request data from one or more other modules (not shown) of the computing device 1200. Applications typically run within an upper layer of the software architectures and may be implemented in a rich execution environment of the computing device 1200, and may include indoor navigation applications, shopping applications, location aware service applications, etc. However, the application module 1245 may also run in the trusted execution environment 1280 of the computing device 1200 or may rely on program code that operates in the trusted execution environment 1280 of the computing device 1200. For example, the program code that implements that side-channel attack resistant processes discussed herein can be implemented in the trusted execution environment 1280 and at least a portion of the memory 1240 may be allocated to the trusted execution environment 1280 for storage of data and program code associated with trusted applications and program code.

The processor 1210 may include a trusted execution environment 1280. The trusted execution environment 1280 can be used to implement, at least in part, a secure processing environment for implementing the processes for providing data protection for a cache discussed above. The trusted execution environment 1280 can be implemented as a secure area of the processor 1210 that can be used to process and store sensitive data in an environment that is segregated from the rich execution environment in which the operating system and/or applications (such as those of the application module 1245) may be executed. The trusted execution environment 1280 can be configured to execute trusted applications that provide end-to-end security for sensitive data by enforcing confidentiality, integrity, and protection of the sensitive data stored therein. The trusted execution environment 1280 can be used to store encryption keys, authentication keys, and/or other sensitive data. Furthermore, the trusted execution environment 1280 can be used to implement the various processes illustrated in FIGS. 1-11 and discussed herein. The trusted application environment can be configured to store data and/or executable program instructions in the memory 1240, and the data stored in the memory 1240 can be encrypted and authenticated to ensure that the data cannot be utilized or modified by non-trusted processes.

The computing device 1200 may further include a user interface 1250 providing suitable interface systems, such as a microphone/speaker 1255, a keypad 1260, and a display 1265 that allows user interaction with the computing device 1200. The microphone/speaker 1255 provides for audio input and/or output. The keypad 1260 may comprise suitable buttons for user input. The display 1265 may include a suitable display, such as, for example, a backlit LCD display, and may further include a touch screen display for additional user input modes. One or more of the components of the user interface 1250 may be remote from the computing device 1200 and/or provide remote access to the computing device 1200 by an administrator. The computing device 1200 can be a server that is part of a collection of servers of a data center that collectively provide computing resources, such as a cloud computing.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device or external to the device. As used herein the term "memory" refers to any type of long term, short term, volatile, nonvolatile, or other memory and is not to be limited to any particular type of memory or number of memories, or type of media upon which memory is stored.

If implemented in-part by hardware or firmware along with software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

What is claimed:

1. A method for mitigating side-channel attacks on a cache, the method comprising:
   executing a software instruction indicating that a portion of software requiring data protection is about to be executed;
   invalidating cache lines of the cache prior to setting the cache to operate in a randomized mode;
   setting the cache to operate in the randomized mode in which selection of memory locations for storing data in the cache is randomized, such that a respective memory location for storing data in the cache is unrelated to a memory location associated with the data in a memory external to the cache, to de-correlate cache timing and cache miss behavior from data being processed by the portion of software requiring data protection responsive to the instruction indicating that the portion of software requiring data protection is about to be executed;
   executing the portion of software requiring data protection;
   storing the data being processed by the portion of software requiring data protection, wherein storing the data further comprises:
     selecting a storage location by randomly selecting:
       a partition of a plurality of partitions of the cache,
       a set of one or more cache lines of the cache,
       or both, and
     storing the data in the storage location; and
   setting the cache to operate in a standard operating mode responsive to an instruction indicating that execution of the portion of software requiring data protection has completed.

2. The method of claim 1, wherein setting the cache to operate in the standard operating mode responsive to the instruction indicating that execution of the portion of software requiring data protection has completed further comprises:
   invalidating cache lines of the cache prior to setting the cache to operate in the standard operating mode.

3. The method of claim 1, wherein selecting the storage location by randomly selecting the partition of the cache, the set of one or more cache lines of the cache, or both further comprises:
   randomly selecting the set of one or more cache lines of a respective partition of the plurality of partitions associated with the data to be stored in the cache as the storage location.

4. The method of claim 1, wherein selecting the storage location by randomly selecting a partition of the cache, the set of one or more cache lines of the cache, or both further comprises:
   randomly selecting the partition of the cache comprising one or more cache lines; and
   randomly selecting a set of one or more cache lines of the partition of the cache randomly selected as the storage location.

5. The method of claim 1, further comprising:
   determining that a context switch has occurred while executing the portion of software requiring data protection;
   storing cache status information for restoring a current cache operating mode in a protected memory location;
   invalidating cache lines of the cache; and
   setting the cache to operate in the standard operating mode responsive to the context switch.

6. The method of claim 5, further comprising:
   determining that a second context switch to continue executing the portion of software requiring data protection has occurred;
   accessing the cache status information for restoring the current cache operating mode in the protected memory location; and
   setting the cache to operate in the randomized mode using the cache status information.

7. The method of claim 1, wherein executing the portion of software requiring data protection further comprises:
   trapping an exception;
   invalidating cache lines of the cache; and performing one or more exception handling actions responsive to the exception.

8. The method of claim 1, further comprising:
monitoring execution of instructions associated with the portion of software requiring data protection to ensure that both an entry instruction for entering the instructions associated with the portion of software requiring data protection and an exit instruction exiting the portion of software requiring data protection are executed.

9. The method of claim 1, wherein the memory location associated with the data in the memory external to the cache is a memory location from which the data was read into the cache or to which the data is to be written from the cache and into the memory external to the cache.

10. An apparatus comprising:
a memory; and
a processor coupled to the memory, the processor configured to:
execute a software instruction indicating that a portion of software requiring data protection is about to be executed;
invalidate cache lines of the cache prior to setting the cache to operate in a randomized mode;
set a cache to operate in the randomized mode in which selection of memory locations for storing data in the cache is randomized, such that a respective memory location for storing data in the cache is unrelated to a memory location associated with the data in a memory external to the cache, to de-correlate cache timing and cache miss behavior from the data being processed by the portion of software requiring data protection responsive to the instruction indicating that the portion of software requiring data protection is about to be executed;
execute the portion of software requiring data protection;
store the data being processed by the portion of software requiring data protection, wherein the processor is further configured to
select a storage location by randomly selecting:
a partition of a plurality of partitions of the cache, one or more cache lines of the cache, or both, and
store the data in the storage location; and
set the cache to operate in a standard operating mode responsive to an instruction indicating that execution of the portion of software requiring data protection has completed.

11. The apparatus of claim 10, wherein the processor being configured to set the cache to operate in the standard operating mode responsive to the instruction indicating that execution of the portion of software requiring data protection has completed is further configured to:
invalidate cache lines of the cache prior to setting the cache to operate in the standard operating mode.

12. The apparatus of claim 10, wherein the processor being configured to select the storage location by randomly selecting a partition of the cache, the set of one or more cache lines of the cache, or both is further configured to:
randomly select the set of one or more cache lines of a respective partition of the plurality of partitions associated with the data to be stored in the cache as the storage location.

13. The apparatus of claim 10, wherein the processor being configured to select the storage location by randomly selecting a partition of the cache, the set of one or more cache lines of the cache, or both is further configured to:
randomly select the partition of the cache comprising one or more cache lines; and
randomly select a set of one or more cache lines of the partition of the cache randomly selected as the storage location.

14. The apparatus of claim 10, wherein the processor is further configured to:
determine that a context switch has occurred while executing the portion of software requiring data protection;
store cache status information for restoring a current cache operating mode in a protected memory location;
invalidate cache lines of the cache; and
set the cache to operate in the standard operating mode responsive to the context switch.

15. The apparatus of claim 14, wherein the processor is further configured to:
determine that a second context switch to continue executing the portion of software requiring data protection has occurred;
access the cache status information for restoring the current cache operating mode in the protected memory location; and
set the cache to operate in the randomized mode using the cache status information.

16. The apparatus of claim 10, wherein the processor being configured to execute the portion of software requiring data protection is further configured to:
trap an exception;
invalidate cache lines of the cache; and
perform one or more exception handling actions responsive to the exception.

17. The apparatus of claim 10, wherein the processor is further configured to:
monitor execution of instructions associated with the portion of software requiring data protection to ensure that both an entry instruction for entering the instructions associated with the portion of software requiring data protection and an exit instruction exiting the portion of software requiring data protection are executed.

18. An apparatus comprising:
a processor for executing a software instruction indicating that a portion of software requiring data protection is about to be executed;
the processor comprising means for invalidating cache lines of a cache prior to setting the cache to operate in a randomized mode;
the processor comprising means for setting the cache to operate in the randomized mode in which selection of memory locations for storing data in the cache is randomized, such that a respective memory location for storing data in the cache is unrelated to a memory location associated with the data in a memory external to the cache, to de-correlate cache timing and cache miss behavior from data being processed by the portion of software requiring data protection responsive to the instruction indicating that the portion of software requiring data protection is about to be executed;
the processor comprising means for executing the portion of software requiring data protection;
the processor comprising means for storing the data being processed by the portion of software requiring data protection, wherein the means storing the data further comprises:

means for selecting a storage location by randomly selecting:
　a partition of a plurality of partitions of the cache,
　a set of one or more cache lines of the cache,
　or both; and
means for storing the data in the storage location; and
the processor comprising means for setting the cache to operate in a standard operating mode responsive to an instruction indicating that execution of the portion of software requiring data protection has completed.

19. The apparatus of claim 18, wherein the means for setting the cache to operate in the standard operating mode responsive to the instruction indicating that execution of the portion of software requiring data protection has completed further comprises:
　means for invalidating cache lines of the cache prior to setting the cache to operate in the standard operating mode.

20. The apparatus of claim 18, wherein the means for selecting the storage location by randomly selecting the partition of the cache, the set of one or more cache lines of the cache, or both further comprises:
　means for randomly selecting the partition of the cache comprising one or more cache lines; and
　means for randomly selecting a set of one or more cache lines of the partition of the cache randomly selected as the storage location.

21. The apparatus of claim 18, wherein the means for storing the data being processed by the portion of software requiring data protection further comprises:
　means for randomly selecting the set of one or more cache lines of a respective partition of the plurality of partitions associated with the data to be stored in the cache as the storage location.

22. A non-transitory, computer-readable medium, having stored thereon computer-readable instructions for mitigating side-channel attacks on a cache, comprising instructions configured to cause a computing device to:
　execute a software instruction indicating that a portion of software requiring data protection is about to be executed;
　invalidate cache lines of the cache prior to setting the cache to operate in a randomized mode;
　set the cache to operate in the randomized mode in which selection of memory locations for storing data in the cache is randomized, such that a respective memory location for storing data in the cache is unrelated to a memory location associated with the data in a memory external to the cache, to de-correlate cache timing and cache miss behavior from data being processed by the portion of software requiring data protection responsive to the instruction indicating that the portion of software requiring data protection is about to be executed;
　execute the portion of software requiring data protection;
　store the data being processed by the portion of software requiring data protection, by:
　　selecting a storage location by randomly selecting:
　　　a partition of a plurality of partitions of the cache,
　　　a set of one or more cache lines of the cache,
　　　or both, and
　　storing the data in the storage location; and
　set the cache to operate in a standard operating mode responsive to an instruction indicating that execution of the portion of software requiring data protection has completed.

23. The non-transitory, computer-readable medium of claim 22, wherein the instructions configured to cause the computing device to set the cache to operate in the standard operating mode responsive to the instruction indicating that execution of the portion of software requiring data protection has completed further comprise instructions configured to cause the computing device to:
　invalidate cache lines of the cache prior to setting the cache to operate in the standard operating mode.

24. The non-transitory, computer-readable medium of claim 22, wherein the instructions configured to cause the computing device to store the data being processed by the portion of software requiring data protection in the cache further comprise instructions configured to cause the computing device to:
　randomly select a partition of the plurality of partitions comprising one or more cache lines; and
　randomly select a set of one or more cache lines of the partition of the cache randomly selected as the storage location.

25. The non-transitory, computer-readable medium of claim 22, wherein the instructions configured to cause the computing device to store the data being processed by the portion of software requiring data protection further comprise instructions configured to cause the computing device to:
　randomly select the set of one or more cache lines of a respective partition of the plurality of partitions associated with the data to be stored in the cache as the storage location.

* * * * *